L. W. MASON.
Pole and Shaft.
No. 47,211.  Patented Apr. 11, 1865.
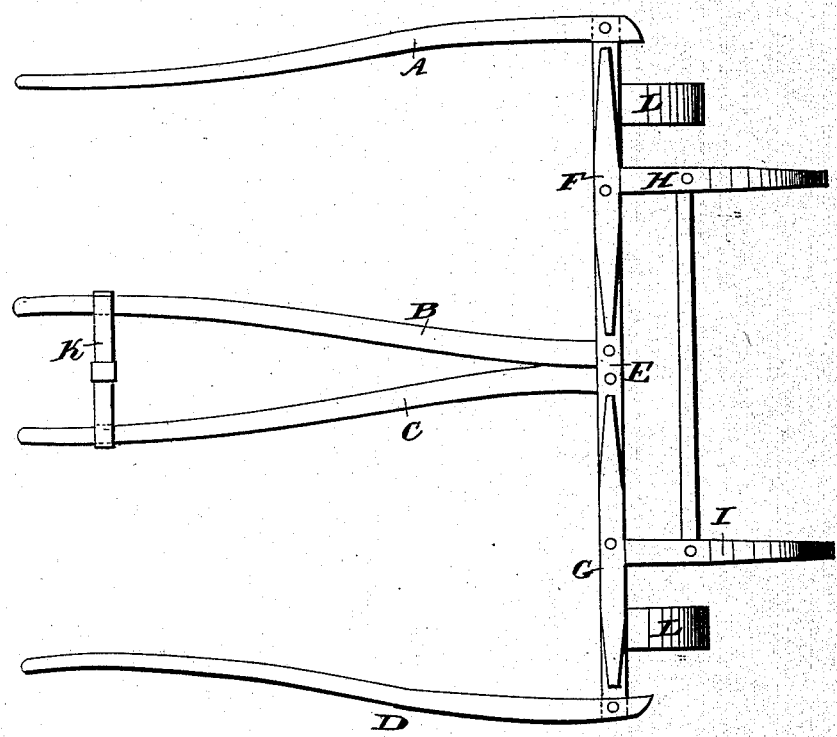
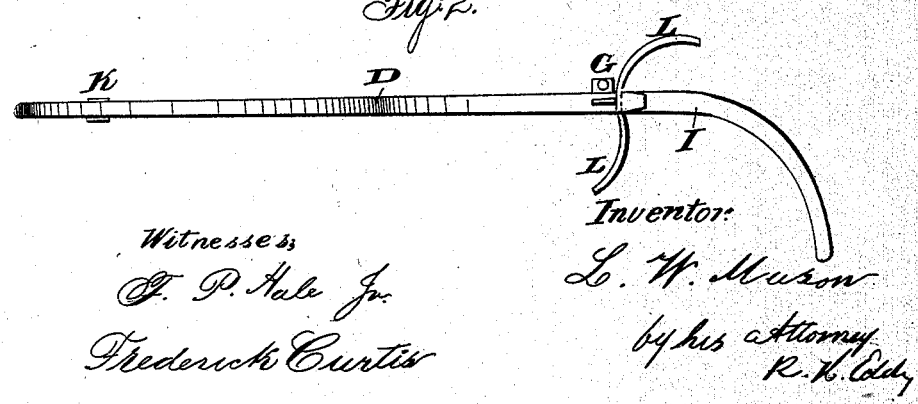

UNITED STATES PATENT OFFICE.

LEWIS W. MASON, SHELBURNE FALLS, MASSACHUSETTS.

IMPROVEMENT IN CARRIAGES.

Specification forming part of Letters Patent No. 47,211, dated April 11, 1865.

*To all whom it may concern:*

Be it known that I, LEWS W. MASON, a resident of Shelburne Falls, in the county of Franklin and State of Massachusetts, have made a new and useful invention having reference to Wheel-Carriages; and I do hereby declare the same to be fully described in the following specification and represented in the accompanying drawings, of which—

Figure 1 denotes a top view, and Fig. 2 a side elevation, of it.

The nature of my invention consists in a peculiar arrangement, as hereinafter specified, of two sets of shafts and a cross-bar with respect to two whiffletrees, whereby the cross-bar is brought in rear of the draft-animals when they are applied to the shafts, and such shafts become a substitute for a pole as ordinarily employed. Also, in the combination and arrangement of a connector with the two sets of shafts combined and arranged together as specified. Also, in the combination and arrangement of mud-guards with the two sets of shafts and their cross-bar arranged together substantially as hereinafter specified.

In the drawings, A B C D are four shafts or thills projecting from a single bar, E, provided with two whiffletrees, F G, and also with two curved arms, H I, the whole being arranged as represented. The said parts H I are to be hinged at their outer ends to the front axle-tree of a carriage, so as to connect the shafts therewith as a single set of shafts are ordinarily applied to an axle-tree. Of the two sets of shafts or thills A B and C D the two adjacent shafts—viz., B and C—are to be provided with a connector, K, which is a leather strap extending from one shaft to the other, and so applied to the two as to connect them near their front ends in such manner that the two shafts may be caused to co-operate in bearing the outward lateral strain of either of the horses or animals, which may be at any time harnessed to the two sets of shafts, they being intended to receive a pair of horses or draft-animals, and so that one of such pair shall be between the thills of each pair A B or C D of shafts. By so connecting the two inner shafts B and C the lateral strain tending to separate either of the shafts B C from its cross-bar, or to weaken the connection of it with such bar, will be counteracted by the rigidity of three shafts, or, at least, by that of the two inner shafts. The two inner shafts, when so conjoined by the connector K, serve also to protect the outer shafts, A and D, from effects of such lateral strain.

A mud-guard, L, is applied to the cross-bar and in rear of each set of shafts, and is arranged in manner with respect to them as shown in the drawings. It serves to intercept mud from the wheels, and thereby prevent it from being thrown upon a horse when in the thills.

The two sets of shafts, combined with one cross-bar, as described, will often be found preferable to a pole in the application of a pair of horses to a carriage, as by means of such sets of shafts common shaft-harnesses may be used instead of pole-harnesses. The spring or elasticity of the shafts will generally suffice to prevent the irregularity of movement of either horse from being inconvenient to the other, or from so acting on the cross-bar as to cause the shafts of the said other horse to play or move in accordance with those of the other when the two horses may not be stepping alike.

I do not claim the combination and arrangement of two sets of thills with a cross-bar and a pole in manner as shown in the patent of Solomon Bolles, dated November 26, 1861.

I claim—

1. My peculiar arrangement of two sets of shafts, A B C D, and a cross-bar, E, with two whiffletrees, F G, whereby the cross-bar carrying the whiffletrees is brought in rear of the draft-animals when they are between the shafts.

2. The combination and arrangement of the connector K and the two sets of shafts A B C D and the cross-bar E.

3. The combination and arrangement of the two mud-guards L L with the two sets of shafts and their cross-bar.

LEWIS W. MASON.

Witnesses:
R. H. EDDY,
F. P. HALE, Jr.